United States Patent
Yamaguchi et al.

(10) Patent No.: US 8,983,215 B2
(45) Date of Patent: Mar. 17, 2015

(54) IMAGE PROCESSING DEVICE AND IMAGE PROCESSING METHOD

(75) Inventors: Masayuki Yamaguchi, Osaka (JP); Shinji Shinjo, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 99 days.

(21) Appl. No.: 13/991,032

(22) PCT Filed: Nov. 4, 2011

(86) PCT No.: PCT/JP2011/075403
§ 371 (c)(1),
(2), (4) Date: May 31, 2013

(87) PCT Pub. No.: WO2012/073644
PCT Pub. Date: Jun. 7, 2012

(65) Prior Publication Data
US 2013/0251277 A1    Sep. 26, 2013

(30) Foreign Application Priority Data

Dec. 1, 2010  (JP) .................................. 2010-268098

(51) Int. Cl.
| | |
|---|---|
| G06K 9/36 | (2006.01) |
| G06T 9/00 | (2006.01) |
| G09G 3/36 | (2006.01) |
| H04N 19/12 | (2014.01) |
| H04N 19/176 | (2014.01) |
| H04N 19/147 | (2014.01) |

(52) U.S. Cl.
CPC ........ *G06T 9/004* (2013.01); *G09G 3/36* (2013.01); *G09G 2300/0452* (2013.01); *G09G 2320/0252* (2013.01); *G09G 2340/02* (2013.01); *G09G 2340/06* (2013.01); *G09G 2340/16* (2013.01); *H04N 19/00078* (2013.01); *H04N 19/00278* (2013.01); *H04N 19/00175* (2013.01)
USPC .......................................................... 382/233

(58) Field of Classification Search
None
See application file for complete search history.

(56) References Cited

U.S. PATENT DOCUMENTS

| | | |
|---|---|---|
| 2005/0237316 A1 | 10/2005 | Huang et al. |
| 2006/0152501 A1 | 7/2006 | Furihata et al. |
| 2009/0315920 A1 | 12/2009 | Sakurai et al. |

FOREIGN PATENT DOCUMENTS

| | | |
|---|---|---|
| JP | 2005-316369 A | 11/2005 |
| JP | 2006-195151 A | 7/2006 |
| JP | 2006-267172 A | 10/2006 |
| JP | 2008-281734 A | 11/2008 |
| JP | 2010-002668 A | 1/2010 |

OTHER PUBLICATIONS

International Search Report for PCT/JP2011/075403 dated Feb. 7, 2012.

*Primary Examiner* — Stephen R Koziol
*Assistant Examiner* — Amandeep Saini
(74) *Attorney, Agent, or Firm* — Birch, Stewart, Kolasch & Birch, LLP (57) ABSTRACT

An image processing device that reduces influence by a compressibility error of image data generated by a previous frame on output image data is disclosed. The image processing device generates a compressibility error prediction value, based on an input image data, generates substitute image data of the input image data, based on an emergence tendency of the compressibility error, selects the input image data or the substitute image data to set a result as current image data, generates next state image data, compresses the next state image data to generate compressed state image data, stores the compressed state image data in a frame memory, generates the state image data by reading the compressed state image data from the frame memory and decompressing the same, and generates output image data, based on the current image data and the state image data.

10 Claims, 7 Drawing Sheets

Fig. 1

| (0) | Frame Index | | 1 | 2 | 3 | 4 | 5 | 6 | 7 | 8 | 9 | 10 | 11 | 12 | 13 | 14 | 15 | 16 | |
|---|---|---|---|---|---|---|---|---|---|---|---|---|---|---|---|---|---|---|---|
| (1) | Input Image Data | di | 103 | 150 | 179 | 199 | 1 | 2 | 3 | 4 | 7 | 57 | 107 | 157 | 207 | 157 | 107 | 57 | ... |
| (2) | (After Compression & Decompression) | dix | 96 | 144 | 176 | 192 | 0 | 0 | 0 | 0 | 0 | 48 | 96 | 144 | 192 | 144 | 96 | 48 | ... |
| (3) | Compressibility Error Prediction Value | err | −7 | −6 | −3 | −7 | −1 | −2 | −3 | −4 | −7 | −9 | −11 | −13 | −15 | −13 | −11 | −9 | ... |
| (4) | Substitute Image Data | dia | 95 | 142 | 171 | 191 | −7 | −6 | −5 | −4 | −1 | 49 | 99 | 149 | 199 | 149 | 99 | 49 | ... |
| (5) | Current Image Data | dc | 103 | 150 | 179 | 199 | 1 | 2 | 3 | 4 | 7 | 49 | 99 | 149 | 199 | 149 | 99 | 49 | ... |
| (6) | Next State Image Data | dp | 103 | 150 | 179 | 199 | 96 | 48 | 24 | 8 | 7 | 49 | 99 | 149 | 199 | 149 | 99 | 49 | ... |
| (7) | State Image Data | dr | 103 | 144 | 176 | 192 | 96 | 48 | 16 | 0 | 0 | 48 | 96 | 144 | 192 | 144 | 96 | 48 | ... |
| (8) | Output Image Data | dq | | 197 | 214 | 222 | 0 | 0 | 0 | 0 | 14 | 98 | 150 | 202 | 254 | 106 | 54 | 2 | ... |
| (9) | Actual Next State Image Data | dpa | 103 | 150 | 182 | 202 | 101 | 51 | 26 | 13 | 14 | 56 | 103 | 153 | 204 | 155 | 105 | 54 | ... |
| (10) | Difference Δdp | dpa−dp | | 0 | 3 | 3 | 5 | 3 | 2 | 5 | 7 | 7 | 4 | 4 | 5 | 6 | 6 | 5 | ... |
| (11) | Difference Δdq | dq−dq1 | | 0 | 6 | 3 | 0 | 0 | 0 | 0 | 13 | −9 | −7 | −5 | −3 | −1 | −3 | −5 | ... |

Fig. 2

| (0) | Frame Index | | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|---|---|---|---|---|---|---|---|---|
| (1) | Input Image Data | di | 103 | 150 | 179 | 199 | 1 | 2 | 3 | 4 | 7 | 57 | 107 | 157 | 207 | 157 | 107 | 57 | ... |
| (2) | (After Compression & Decompression) | dix | 96 | 144 | 176 | 192 | 0 | 0 | 0 | 0 | 0 | 48 | 96 | 144 | 192 | 144 | 96 | 48 | ... |
| (3) | Compressibility Error Prediction Value | err | −7 | −6 | −3 | −7 | −1 | −2 | −3 | −4 | −7 | −9 | −11 | −13 | −15 | −13 | −11 | −9 | ... |
| (4) | Substitute Image Data | dia | 96 | 144 | 176 | 192 | 0 | 0 | 0 | 0 | 0 | 48 | 96 | 144 | 192 | 144 | 96 | 48 | ... |
| (5) | Current Image Data | dc | 103 | 150 | 179 | 199 | 1 | 2 | 3 | 4 | 7 | 48 | 96 | 144 | 192 | 144 | 96 | 48 | ... |
| (6) | Next State Image Data | dp | 103 | 150 | 179 | 199 | 96 | 48 | 24 | 8 | 7 | 48 | 96 | 144 | 192 | 144 | 96 | 48 | ... |
| (7) | State Image Data | dr | 103 | 144 | 176 | 192 | 96 | 48 | 16 | 0 | 0 | 48 | 96 | 144 | 192 | 144 | 96 | 48 | ... |
| (8) | Output Image Data | dq | | 197 | 214 | 222 | 0 | 0 | 0 | 0 | 14 | 96 | 144 | 192 | 240 | 96 | 48 | 0 | ... |
| (9) | Actual Next State Image Data | dpa | 103 | 150 | 182 | 202 | 101 | 51 | 26 | 13 | 14 | 55 | 100 | 146 | 193 | 145 | 97 | 49 | ... |
| (10) | Difference Δdp | dpa−dp | | 0 | 3 | 3 | 5 | 3 | 2 | 5 | 7 | 7 | 4 | 2 | 1 | 1 | 1 | 1 | ... |
| (11) | Difference Δdq | dq−dq1 | | 0 | 6 | 3 | 0 | 0 | 0 | 0 | 13 | −11 | −13 | −15 | −17 | −11 | −9 | −7 | ... |

Fig. 3

| (0) | Frame Index | | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|---|---|---|---|---|---|---|---|---|
| (1) | Input Image Data | di | 103 | 150 | 179 | 199 | 1 | 2 | 3 | 4 | 7 | 57 | 107 | 157 | 207 | 157 | 107 | 57 | ... |
| (2) | (After Compression & Decompression) | dix | 96 | 144 | 176 | 192 | 0 | 0 | 0 | 0 | 0 | 48 | 96 | 144 | 192 | 144 | 96 | 48 | ... |
| (3) | Compressibility Error Prediction Value | err | −7 | −6 | −3 | −7 | −1 | −2 | −3 | −4 | −7 | −9 | −11 | −13 | −15 | −13 | −11 | −9 | ... |
| (4) | Substitute Image Data | dia | 100 | 147 | 178 | 196 | 1 | 1 | 2 | 2 | 4 | 53 | 102 | 151 | 200 | 151 | 102 | 53 | ... |
| (5) | Current Image Data | dc | 103 | 150 | 179 | 199 | 1 | 2 | 3 | 4 | 7 | 53 | 102 | 151 | 200 | 151 | 102 | 53 | ... |
| (6) | Next State Image Data | dp | 103 | 150 | 179 | 199 | 96 | 48 | 24 | 8 | 7 | 53 | 102 | 151 | 200 | 151 | 102 | 53 | ... |
| (7) | State Image Data | dr | 103 | 144 | 176 | 192 | 96 | 48 | 16 | 0 | 0 | 48 | 96 | 144 | 192 | 144 | 96 | 48 | ... |
| (8) | Output Image Data | dq | | 197 | 214 | 222 | 0 | 0 | 0 | 0 | 14 | 106 | 156 | 206 | 256 | 110 | 60 | 10 | |
| (9) | Actual Next State Image Data | dpa | 103 | 150 | 182 | 202 | 101 | 51 | 26 | 13 | 14 | 60 | 108 | 157 | 207 | 159 | 110 | 60 | ... |
| (10) | Difference Δ dp | dpa−dp | | 0 | 3 | 3 | 5 | 3 | 2 | 5 | 7 | 7 | 6 | 6 | 7 | 8 | 8 | 7 | ... |
| (11) | Difference Δ dq | dq−dq1 | | 0 | 6 | 3 | 0 | 0 | 0 | 0 | 13 | −1 | −1 | −1 | −1 | 3 | 3 | 3 | ... |

| (0) | Frame Index | | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|---|---|---|---|---|---|---|---|---|
| (1) | Input Image Data | di | 103 | 150 | 179 | 199 | 1 | 2 | 3 | 4 | 7 | 57 | 107 | 157 | 207 | 157 | 107 | 57 | ... |
| (2) | Next State Image Data | dp1 | 103 | 150 | 179 | 199 | 100 | 50 | 25 | 13 | 7 | 57 | 107 | 157 | 207 | 157 | 107 | 57 | ... |
| (3) | Output Image Data | dq1 | | 197 | 208 | 219 | 0 | 0 | 0 | 0 | 1 | 107 | 157 | 207 | 257 | 107 | 57 | 7 | ... |

Fig. 6

| (0) | Frame Index | 1 | 2 | 3 | 4 | 5 | 6 | 7 | 8 | 9 | 10 | 11 | 12 | 13 | 14 | 15 | 16 | ... |
|---|---|---|---|---|---|---|---|---|---|---|---|---|---|---|---|---|---|---|
| (1) | Input Image Data | di | 103 | 150 | 179 | 199 | 1 | 2 | 3 | 4 | 7 | 57 | 107 | 157 | 207 | 157 | 107 | 57 | ... |
| (2) | Next State Image Data | dp2 = G(di, dr2) | 103 | 150 | 179 | 199 | 96 | 48 | 24 | 8 | 7 | 57 | 107 | 157 | 207 | 157 | 107 | 57 | ... |
| (3) | State Image Data | dr2 | 96 | 144 | 176 | 192 | 96 | 48 | 16 | 0 | 0 | 48 | 96 | 144 | 192 | 144 | 96 | 48 | ... |
| (4) | Output Image Data | dq2 = F(di, dr2) | | 204 | 214 | 222 | 0 | 0 | 0 | 0 | 14 | 114 | 166 | 218 | 270 | 122 | 70 | 18 | ... |
| (5) | Actual Next State Image Data | dpa2 | 103 | 154 | 184 | 203 | 102 | 51 | 26 | 13 | 14 | 64 | 115 | 167 | 219 | 171 | 121 | 70 | ... |
| (6) | Difference Δdp2 | dpa2−dp2 | | 4 | 5 | 4 | 6 | 3 | 2 | 5 | 7 | 7 | 8 | 10 | 12 | 14 | 14 | 13 | ... |
| (7) | Difference Δdq2 | dq2−dq1 | | 7 | 6 | 3 | 0 | 0 | 0 | 0 | 13 | 7 | 9 | 11 | 13 | 15 | 13 | 11 | ... |

Fig. 7

IMAGE PROCESSING DEVICE AND IMAGE PROCESSING METHOD

CROSS-REFERENCE TO RELATED APPLICATIONS

This application is a National Phase filing under 35 U.S.C. §371 of International Application No. PCT/JP2011/075403 filed on Nov. 4, 2011, and which claims priority to Japanese Patent Application No. 2010-268098 filed on Dec. 1, 2010.

TECHNICAL FIELD

The present invention relates to an image processing device and an image processing method, and particularly to an image processing device and an image processing method in which predetermined image data is subjected to data compression processing as a state image data to be stored in a frame memory, and the data is read from the frame memory to perform data processing of a next frame to be subjected to data decompression processing for use.

BACKGROUND ART

As an image processing device, there has been one that generates output image data by performing data processing of image input data, depending on not only current image data input but also a state resulting from processing of past image data input. In the above-described image processing device, the data indicating the state resulting from the processing is generated as state image data to be temporarily stored in an image memory called a frame memory, and is used for data processing of a next frame (e.g., see Patent Document 1).

On the other hand, with recent rapid increase in definition and processing speed of image data, an image data amount to be processed by a device and a system has been explosively increasing. According to this, a required frame memory size and data transfer capability to the frame memory have been increasing as well, so that implement in a practical circuit has become difficult. Thus, reduction in an amount of data stored in the frame memory is very important.

Figure 5:
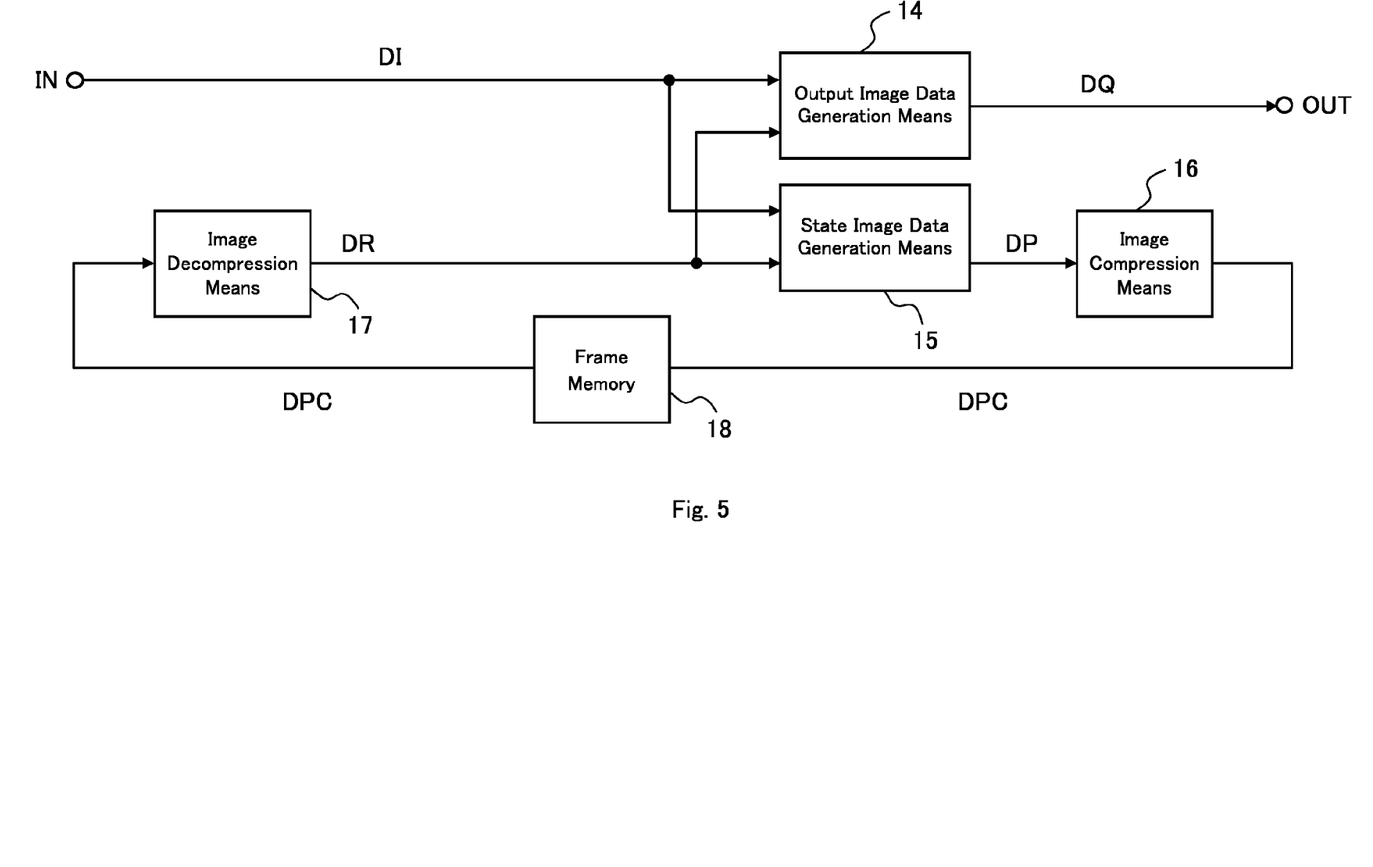
FIG. 5 is a block diagram showing a schematic configuration of one typical example of a conventional image processing device that performs compression/decompression processing to next state image data.

As a method for reducing the amount of data, a technique of encoding and compressing the image data to be stored in the frame memory is generally employed. FIG. 5 is a block diagram showing a schematic configuration of a typical image processing device that generates state image data from input image data and compresses the state image data to store the same in the frame memory, and generates output image data, using the decompressed state image data in processing of a next frame.

Conventionally, for image compression to the frame memory, various methods have been proposed and disclosed as patents. Broadly speaking, as the image compression technique, there are a reversible compression technique and an irreversible compression technique. The former is also called lossless compression, and when data is compressed and decompressed, the original data can be restored without loss of an information amount. The latter is called lossy compression, and even when the data is compressed and decompressed, there is no assurance that the original data can be restored, and an error occurs between the original data and the data after compression/decompression. This is referred to as a compressibility error. Though the compressibility error is 0, generally in the lossless compression, the lossy compression is used when the frame memory amount is desired to be largely reduced since the lossy compression is high in compressibility. Patent Document 2 discloses, as one technique of the lossy compression, a device in which encoding means with smaller signal deterioration is selected from means of encoding image input data (PCM processing) and means of differentially encoding the image input data (DPCM processing) to reduce and eliminate image quality deterioration. An image processing device, which the present invention targets, can be configured as shown in FIG. 5, for example, using the device disclosed in Patent Document 2 as image compression means and image decompression means.

In the image processing device shown in FIG. 5, the compressibility error occurs when the state image data is compressed and stored in the frame memory, and the state image data stored in the frame memory is decompressed at the time of data processing of the next frame. The compressibility error is decided in accordance with a processing method of the image compression means and the image decompression means, and is preferably smaller, because precise processing at a subsequent stage can be expected.

PRIOR ART DOCUMENTS

Patent Documents

Patent Document 1: JP 2007-52127 A
Patent Document 2: JP 2010-4514 A

SUMMARY OF THE INVENTION

Problems to be Solved by the Invention

Reducing compressibility error by the lossy compression as much as possible is a problem in various compression techniques, and there is a limit in solving the problem. For example, in the image processing device shown in FIG. 5, when the compressibility error occurs in the state image data generated by the image decompression means, the compressibility error is amplified by output image data generation means, so that there is a possibility that the output image data largely strays from expected data. Moreover, discrepancy in a gradation value attributed to the compressibility error occurs between the state image data referred to for the next frame, and actual state image data resulting from being driven in accordance with the output image data with the amplified compressibility error, which is disadvantageously accumulated every time the frame is updated.

The present invention is achieved in light of the above-described problem, and an object thereof is to provide an image processing device and an image processing method capable of reducing influence of a compressibility error occurring in image data stored in a frame memory on output image data.

Means for Solving the Problem

In order to attain the above object, the present invention provides an image processing device comprising:
state image data generation means for generating next state image data for use at the time of next frame processing, based on current image data and state image data;
image compression means for compressing the next state image data to generate compressed state image data;
a frame memory that stores the compressed state image data;
image decompression means for reading, from the frame memory, the compressed state image data stored at the time of previous frame processing, and decompressing the data to generate the state image data;

output image data generation means for generating output image data, based on the current image data and the state image data;

compressibility error prediction means for generating a compressibility error prediction value of a compressibility error caused by the image compression means and the image decompression means, based on input image data;

substitute image data generation means for generating substitute image data for the input image data, based on an emergence tendency of the compressibility error; and current image data selection means for selecting any one of the input image data and the substitute image data to set a result as the current image data.

Further, in order to attain the above object, the present invention provides an image processing method comprising:

a state image data generation step for generating next state image data for use at the time of next frame processing, based on current image data and state image data;

an image compression step for compressing the next state image data to generate compressed state image data;

a storage step for storing the compressed state image data in a frame memory;

an image decompression step for reading, from the frame memory, the compressed state image data stored at the time of previous frame processing, and decompressing the data to generate the state image data;

an output image data generation step for generating output image data, based on the current image data and the state image data;

a compressibility error prediction step for generating a compressibility error prediction value of a compressibility error caused by the image compression step and the image decompression step, based on input image data;

a substitute image data generation step for generating substitute image data for the input image data, based on an emergence tendency of the compressibility error; and a current image data selection step for selecting any one of the input image data and the substitute image data to set a result as the current image data.

Further, in the image processing device or method having the above characteristics, it is preferable that, for each piece of pixel data of the input image data, based on processing contents of the state image data generation means or step, the image compression means or step, and the image decompression means or step, the compressibility error prediction means or step calculates, as the compressibility error prediction value, a difference between each piece of pixel data of the state image data after compression and decompression processing by the image compression means or step and the image decompression means or step, and that before the compression and decompression processing.

Further, in the image processing device or method having the above characteristics, it is preferable that, for each piece of the pixel data of the input image data, the substitute image data generation means or step generates each piece of pixel data of the substitute image data by a predetermined method decided on the basis of the respective processing contents of the state image data generation means or step, the image compression means or step, and the image decompression means or step.

Further, in the image processing device or method having the above characteristics, it is preferable that, for each piece of the pixel data of the input image data, the substitute image data generation means or step applies correction to increase or decrease a data value to each piece of the pixel data of the input image data in accordance with increase/decrease in a data value of each piece of the pixel data between the next state image data and the state image data, and generates each piece of the pixel data of the substitute image data, the increase/decrease being caused by the compressibility error by the compression and decompression processing by the image compression means or step and the image decompression means or step.

Further, in the image processing device or method having the above characteristics, it is preferable that, for each piece of the pixel data of the input image data, when the compressibility error prediction value is within a predetermined range, the current image data selection means or step selects the input image data, and when the compressibility error prediction value is out of the predetermined range, the current image data selection means or step selects the substitute image data.

Effect of the Invention

According to the above-described image processing device or method, since the respective processing contents in the state image data generation means or step, the image compression means or step, the image decompression means or step, and the output image generation means or step are known in advance, when fluctuation of each piece of the pixel data of the input image data between the adjacent frames is small, the compressibility error to the state image data compressed at the time of previous frame processing can be predicted to some extent at the time of current frame processing, based on the relevant processing contents, and further influence of the compressibility error on the output image data can be predicted to some extent. Therefore, in the case where replacing the input image data by the substitute image data can reduce the influence of the compressibility error, performing the replacement can reduce the influence of the compressibility error on the output image data without reducing the compressibility error itself in the image compression means or step and the image decompression means or step, that is, without sacrificing the data compressibility.

The next state image data generated in the next image data generation means or step originally results from predicting a state (e.g., a gradation value) in the next frame in each pixel driven in accordance with the output image data generated in the output image generation means or step. Here, on the assumption that the compressibility error is not superimposed on the state image data used in the generation of the output image data at the time of data processing in the previous frames, if the compressibility error is superimposed on the state image data used in the generation of the output image data in the current frame, the influence of the relevant compressibility error is included in the output image data in the current frame. The next state image data generated in the current frame is to predict the state of each pixel in the next frame when being driven in accordance with the output image data generated, based on the state image data including the compressibility error. However, actually, the state of each pixel in the current frame has a proper value not including the compressibility error before being driven in accordance with the output image data, and thus becomes different from the data value indicated in the next state image data by being driven in accordance with the same output image data. Accordingly, even if the compressibility error superimposed on the state image data in the calculation process of the next state image data is not directly propagated, the compressibility error is superimposed on the output image data, and then the state of each pixel in the next frame (for convenience, referred to an "actual next state image data") has the influence of the compressibility error by the output image data, so that discrepancy attributed to the compressibility error occurs between the actual next state image data and the next state image data generated in the state image data generation means or step. Furthermore, since actually, the compressibility error may occur in each frame, the discrepancy is accumulated every frame, and as a result, the compressibility error is also substantially propagated to the state image data, thereby being accumulated. However, according to the above-described image processing device or method, the influence of the compressibility error on the output image data is reduced, and as a result, the above-described propagation and accumulation of the compressibility error to the state image data are suppressed.

MODE FOR CARRYING OUT THE INVENTION

An embodiment of an image processing device according to the present invention (hereinafter, referred to as a "present invention device" as needed), and an image processing method according to the present invention (hereinafter, referred to as a "present invention method" as needed) will be described with referring to the drawings. In order to facilitate comparison with a conventional image processing device shown in FIG. 5, components common to the conventional image processing device are given common reference numerals and signs for description.

Figure 1:
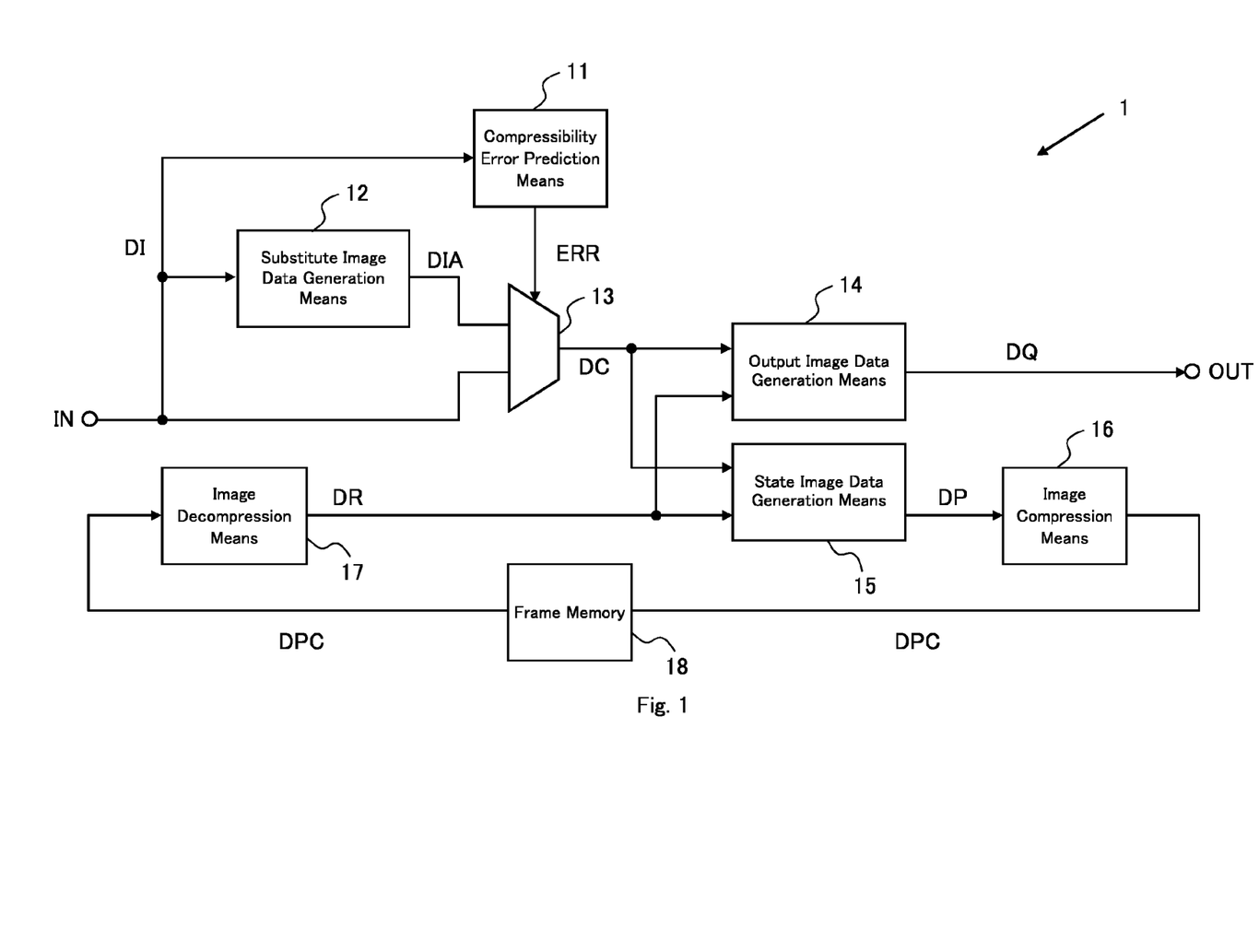
FIG. 1 is a block diagram showing a schematic configuration of one embodiment of an image processing device according to the present invention.

FIG. 1 is a block diagram showing a schematic configuration of the present invention device. As shown in FIG. 1, a present invention device 1 includes an input terminal IN, compressibility error prediction means 11, substitute image data generation means 12, current image data selection means 13, output image data generation means 14, state image data generation means 15, image compression means 16, image decompression means 17, a frame memory 18, and an output terminal OUT. Moreover, the present invention method includes following steps performed by the aforementioned means of the present invention device.

The input terminal IN is a terminal that accepts input of input image data DI to be subjected to image processing. The input image data DI inputted from the input terminal IN is sent to the compressibility error prediction means 11, the substitute image data generation means 12, and the current image data selection means 13.

For each piece of pixel data of the input image data DI, the compressibility error prediction means 11 calculates each piece of pixel data of a compressibility error prediction value ERR, based on respective processing contents of the state image data generation means 15, the image compression means 16 and the image decompression means 17, and sends a result thereof to the substitute image data generation means 12 and the current image data selection means 13 (a compressibility error prediction step).

The substitute image data generation means 12 performs predetermined correction processing to calculate substitute image data DIA for each piece of the pixel data of the input image data DI, and sends a result thereof to the current image data selection means 13 (a substitute image data generation step). The predetermined correction processing will be described in detail in examples described later.

The current image data selection means 13 selects any one of the input image data DI and the substitute image data DIA as current image data DC for each piece of the pixel data of the input image data DI, based on the compressibility error prediction value ERR, and outputs a result thereof to the output image data generation means 14 and the state image data generation means 15 (a current image data selection step).

The output image data generation means 14 calculates output image data DQ obtained by applying predetermined correction processing to each piece of pixel data of the current image data DC from the current image data DC and state image data DR outputted from the image decompression means 17 described later, and outputs a result thereof to the output terminal OUT (an output image data generation step).

The state image data generation means 15 calculates next state image data DP from the current image data DC and the state image data DR outputted from the image decompression means 17, and sends to a result thereof to the image compression means 16 (a state image data generation step).

The image compression means 16 encodes the next state image data DP by a predetermined image compression method (an image compression step), and writes a result thereof in the frame memory 18 as compressed state image data DPC (a storage step). The compressed state image data DPC written in the frame memory 18 is retained during a processing period of one frame.

The image decompression means 17 reads the compressed state image data DPC retained in the frame memory 18 as input to decompress the same by an image decompression method corresponding to the image compression method of the image compression means 16, and sends a result thereof as the state image data DR to the output image data generation means 14 and the state image data generation means 15 for the next frame processing (an image decompression step).

Next, examples (Examples 1 to 3) of the image processing (the present invention method) by the present invention device 1 having the above-described configuration will be described in detail, specifically using numerical value examples.

In each of the following examples, it is assumed that treated image data is a full high-definition image (1920×1080 pixels) with 10-bit gradation values of four colors (R (red), G (green), B (blue) and Y (yellow)). Hereinafter, for clarity of description, whole image data is represented by capital letters with respect to each piece of the image data of FIG. 1, and arbitrary pixel data of the whole image data is represented by lower-case letters. Each piece of the pixel data is specified by designating coordinates and the color. For example, the whole input image data is represented as DI, and the pixel data of an R pixel in (x, y) coordinates of the input image data is represented as di=DI (x, y, R). Similarly, the pixel data of a G pixel in the (x, y) coordinates of the state image data is represented as dr=DR (x, y, G). At this time, 0≤x≤1919 and 0≤y≤1079 are satisfied, and the color can be R/G/B/Y. Each piece of the pixel data can take a gradation value (a positive integer) of 0 to 1023. Moreover, as to the compressibility error prediction value ERR as well, similar to each piece of the image data, the whole compressibility error prediction value is represented as capital letters ERR, and for example, the pixel data of the compressibility error prediction value of a B pixel is represented as err=ERR (x, y, B).

Since the respective means of the present invention device 1 perform serial processing on a pixel basis to the image data to be processed, the pixel data (di, dia, dc, dp, dpc, dr, dq, err) of the respective pieces of image data and the compressibility error prediction value are processing objects.

Moreover, a data processing function of the output image data generation means 14 is represented as F (dc, dr), and a data processing function of the state image data generation means 15 is represented as G (dc, dr), and in the present examples, for simplification of description, as one example, the data processing functions expressed in the following expressions 1 and 2 are used. An operation indicated by [ ] in expression 2 is processing for truncating numerical figures after a decimal point of a numerical value in [ ] to make an integer, which is similar in expression 3 described later.

$$F(dc, dr) = 1023: \quad 2 \times dc - dr > 1023 \quad \text{(Expression 1)}$$
$$= 2 \times dc - dr: \quad 0 \leq 2 \times dc - dr \leq 1023$$
$$= 0: \quad 2 \times dc - dr < 0$$

$$G(dc, dr) = [(1024 + dr)/2]: \quad 2 \times dc - dr > 1023 \quad \text{(Expression 2)}$$
$$= dc: \quad 0 \leq 2 \times dc - dr \leq 1023$$
$$= [(1 + dr)/2]: \quad 2 \times dc - dr < 0$$

The data processing functions exemplified in expressions 1 and 2 are close to functions used in overshoot processing (OS processing, referred to as overdrive processing as well) or the like for increasing a response speed of a moving image in a liquid crystal display device or the like. The OS processing, which allows response of a liquid crystal pixel to follow at a higher speed, is processing for deciding an output value to drive the liquid crystal pixel, based on a state (gradation value) of the liquid crystal pixel before the drive, and the gradation value for display in the current frame. At this time, if the response speed of the liquid crystal is not sufficient, the drive is performed so that the output value is emphasized to be higher or lower than the gradation value for display, by which the gradation value is changed up to a target value for display within required response time (e.g., within 1/240 second in the case of display of 240 sheets per second). The function for deciding this output value is the function F (dc, dr) exemplified in expression 1. As a result of this drive, the function for predicting what gradation value the corresponding liquid crystal pixel will take is the function G (dc, dr) exemplified in expression 2. When although the OS processing is performed, the response is too late, the function G (dc, dr) takes a value different from the gradation value for display. While there is a possibility that the above-described two data processing functions differ on a color basis, they are the same functions in all the colors in the present examples.

Moreover, an encoding processing function of the image compression means 16 is represented as Enc (dp), and a decoding processing function of the image decompression means 17 is represented as Dec (dpc), and in the present examples, data processing functions expressed by the following expressions 3 and 4 are used as one example.

$$Enc(dp) = [dp/16] \quad \text{(Expression 3)}$$

$$Dec(dpc) = dpc \times 16 \quad \text{(Expression 4)}$$

According to data compression and decompression processing expressed by expressions 3 and 4, the image compression means 16 truncates lower 4 bits in pixel data dp of the next state image data DP of 10 bits to quantize to 6-bit data, so that the next state image data DP is compressed to the compressed state image data DPC, and the image decompression means 17 adds 4 bits to the lower side of pixel data dpc of the compressed state image data DPC of 6 bits to fill 0 in the lower 4 bits to return to 10-bit data, so that the compressed state image data DPC is decompressed to the state image data DR. Accordingly, the image compression means 16 and the image decompression means 17 of the present examples fall into the compression means and the decompression means of the lossy compression, because information of the lower 4 bits of each piece of the pixel data dp of the original next state image data DP is lost.

In the present examples, since the respective processing contents of the state image data generation means 15, the image compression means 16, and the image decompression means 17 are set in advance by expressions 2, 3, 4, respectively, for each piece of the pixel data di of the input image data DI in the current frame, the compressibility error prediction means 11 finds, for example, a difference Δdr (=dr−dr0) between the state image data DR resulting from sequentially performing the operations of expressions 2, 3, 4, and a result dr0 when the compression and decompression processing in expressions 3, 4 are not performed, which will be pixel data err of the compressibility error prediction value ERR. In the present examples, since the difference Δdr is calculated based on each piece of the pixel data di of the input image data DI in the current frame and is approximately used as the compressibility error of the state image data DR generated one frame before, it is assumed that values of each piece of the pixel data di of the input image data DI between the adjacent frames are approximate. However, as change of the input image data DI becomes modester between the adjacent frames, the compressibility error becomes relatively larger with respect to the change in each piece of the pixel data di, so that influence of the compressibility error on the output image data DQ and accumulation of the compressibility error in the state image data DR remarkably emerges. On the other hand, if the change of the input image data DI between the adjacent frames is large, the compressibility error becomes smaller with respect to the change of each piece of pixel data di, so that the influence of the compressibility error on the output image data DQ and the accumulation of the compressibility error in the state image data DR are not remarkably visible. Accordingly, the difference Δdr calculated based on the input image data DI of the current frame can be substantially used as the compressibility error prediction value ERR.

Since the data processing function F (dc, dr) of the output image data generation means 14 accepts both the state image data DR and the current image data DC as input data, the compressibility error Δdr is superimposed on the pixel data dr of the state image data DR, which generates some fluctuation Δdq in a processing result dq of F (dc, dr). In the present invention device, in order to reduce the fluctuation Δdq, the compressibility error on the side of the state image data DR is not suppressed. Instead, when it is predicted that the compressibility error is large, without using the pixel data di of the input image data DI in the current frame, pixel data dia of the substitute image data DIA generated by the substitute image data generation means 12 applying the predetermined correction processing to the pixel data di of the input image data DI is used as pixel data dc of the current image data DC to substantially suppress the influence of the compressibility error during the processing of F (dc, dr), by which the fluctuation Δdq is reduced.

While generation algorithm of the substitute image data DIA of the substitute image data generation means 12 is not limited to specific algorithm, it largely depends on the respective processing contents of the output image data generation means 14, the state image data generation means 15, the image compression means 16 and the image decompression means 17, and there exists generation algorithm of the substitute image data DIA that can effectively suppress the compressibility error or the influence of the compressibility error on the output image data DQ as the processing result, although a solution thereof is not necessarily an optimum one. Specifically, since the processing contents of the above-described respective means are known in advance, the compressibility error by the relevant processing contents, and a tendency and characteristics of how the influence of the compressibility error emerges are extracted in advance, which enables the generation algorithm of the substitute image data DIA suitable for the tendency and the characteristics to be set. Hereinafter, three types of generation algorithm will be described as Examples 1 to 3. The three types of generation algorithm of Examples 1 to 3 are expressed by the following expressions 5 to 7 in order, respectively.

$$dia = di - 8 \quad \text{(Expression 5)}$$

$$dia = [di/16] \times 16 = dix \quad \text{(Expression 6)}$$

$$dia = (di + [di/16] \times 16 + 1)/2 = (di + dix + 1)/2 \quad \text{(Expression 7)}$$

In the generation algorithm of Example 1, a constant 8 is subtracted from each piece of the pixel data di of the input image data DI to set a result as each piece of the pixel data dia of the substitute image data DIA. In the generation algorithm of Example 2, a data value (for convenience, represented as "dix") obtained by applying, in order, the compression processing and the decompression processing expressed by expressions 3 and 4 to each piece of the pixel data di of the input image data DI is set as each piece of the pixel data dia of the substitute image data DIA. That is, each piece of the pixel data dia has a value obtained by subtracting the compressibility error to the relevant pixel data di from the pixel data di of the input image data DI. In the generation algorithm of Example 3, an average value between each piece of the pixel data di of the input image data DI and the pixel data dia (=dix) of the substitute image data DIA generated by the generation algorithm of Example 2 is set as each piece of the pixel data dia of the substitute image data DIA. Characteristics of the generation algorithm of the respective examples will be described with reference to calculation examples described later.

For each piece of the pixel data of the input image data DI, the current image data selection means 13 selects, as the pixel data dc of the current image data DC, any one of the pixel data di of the input image data DI inputted from the input terminal IN and the pixel data dia of the substitute image data DIA outputted from the substitute image data generation means 12, based on the pixel data err of the compressibility error prediction value ERR. In the present examples, the above-described selection is simply performed, based on only an absolute value A (=|err|) of the pixel data err of the compressibility error prediction value ERR. Specifically, if the absolute value A is a predetermined threshold TH or higher, the pixel data dia of the substitute image data DIA is selected, and if the absolute value A is lower than the threshold TH, the pixel data di of the input image data DI is selected. In the present examples, the threshold TH is set to, for example, 8.

The respective calculation examples of Examples 1 to 3 will be described. In Examples 1 to 3, only the generation algorithm of the substitute image data DIA of the substitute image data generation means 12 differs from one another, and configurations of the respective means other than the substitute image data generation means 12 are the same.

Figure 2:
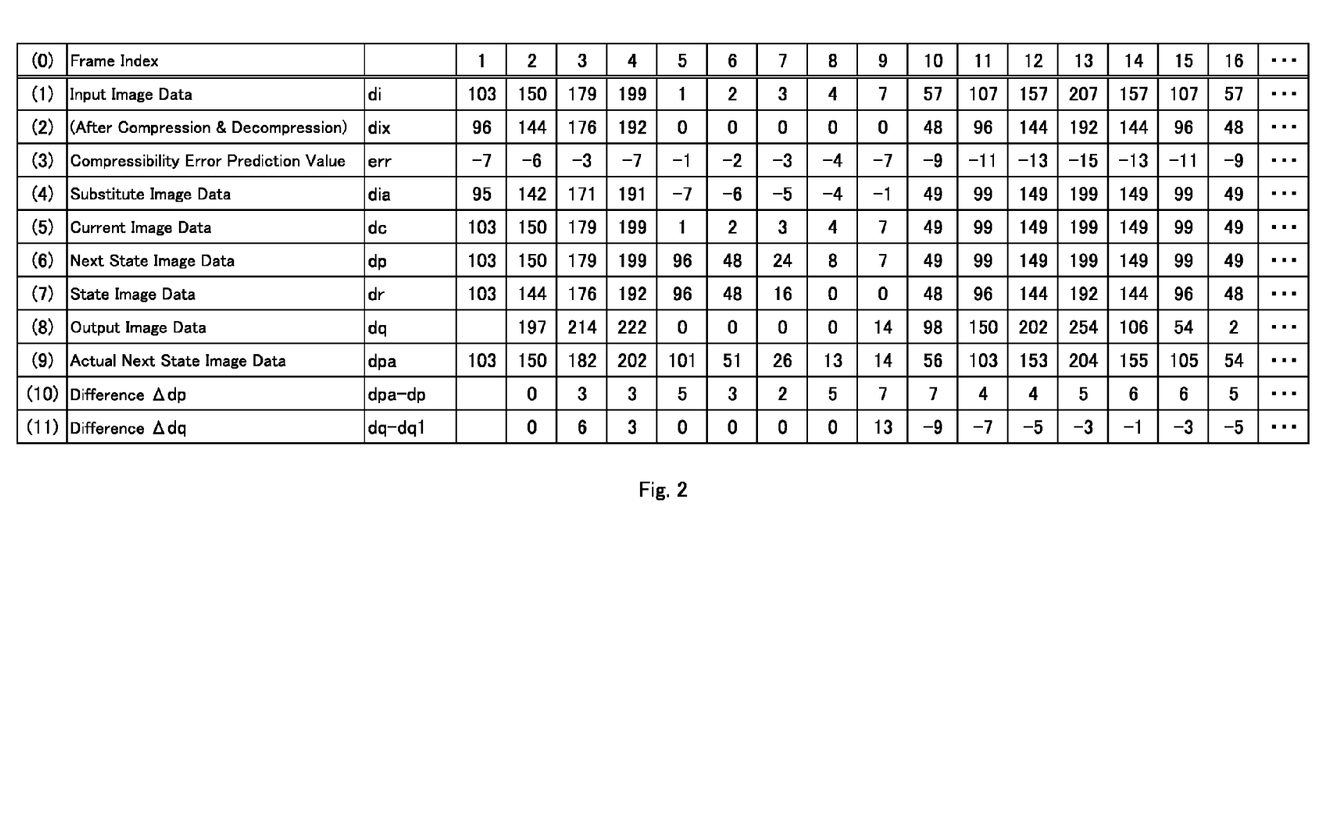
FIG. 2 is a diagram showing processing results and processing performance in Example 1 of the image processing device according to the present invention.
Figure 3:
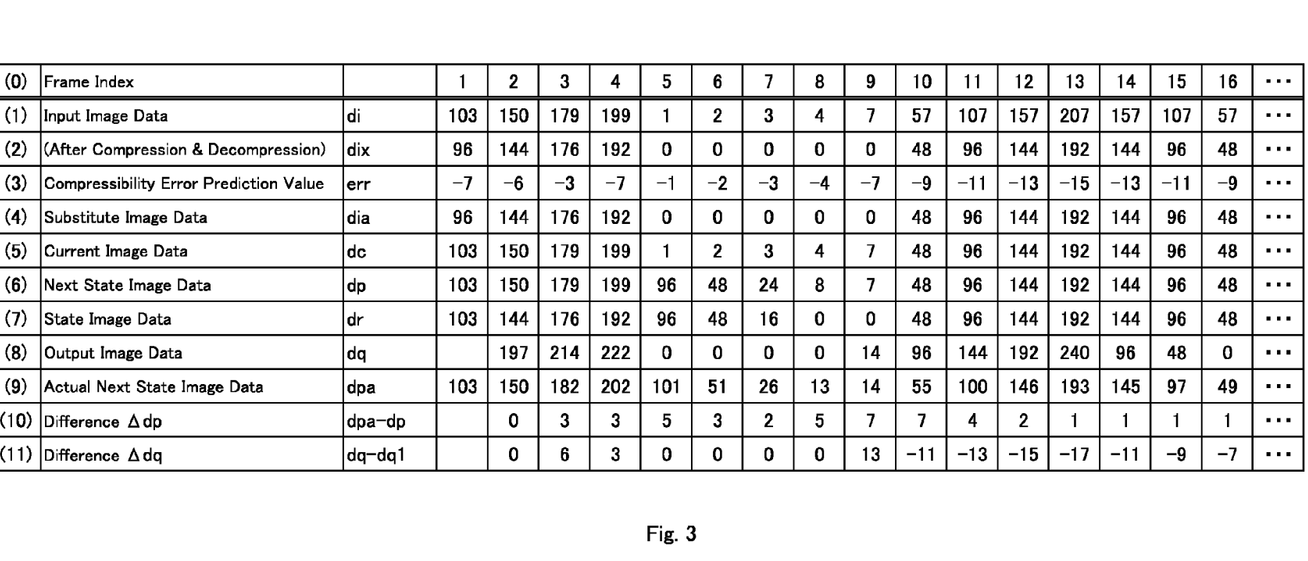
FIG. 3 is a diagram showing processing results and processing performance in Example 2 of the image processing device according to the present invention.
Figure 4:
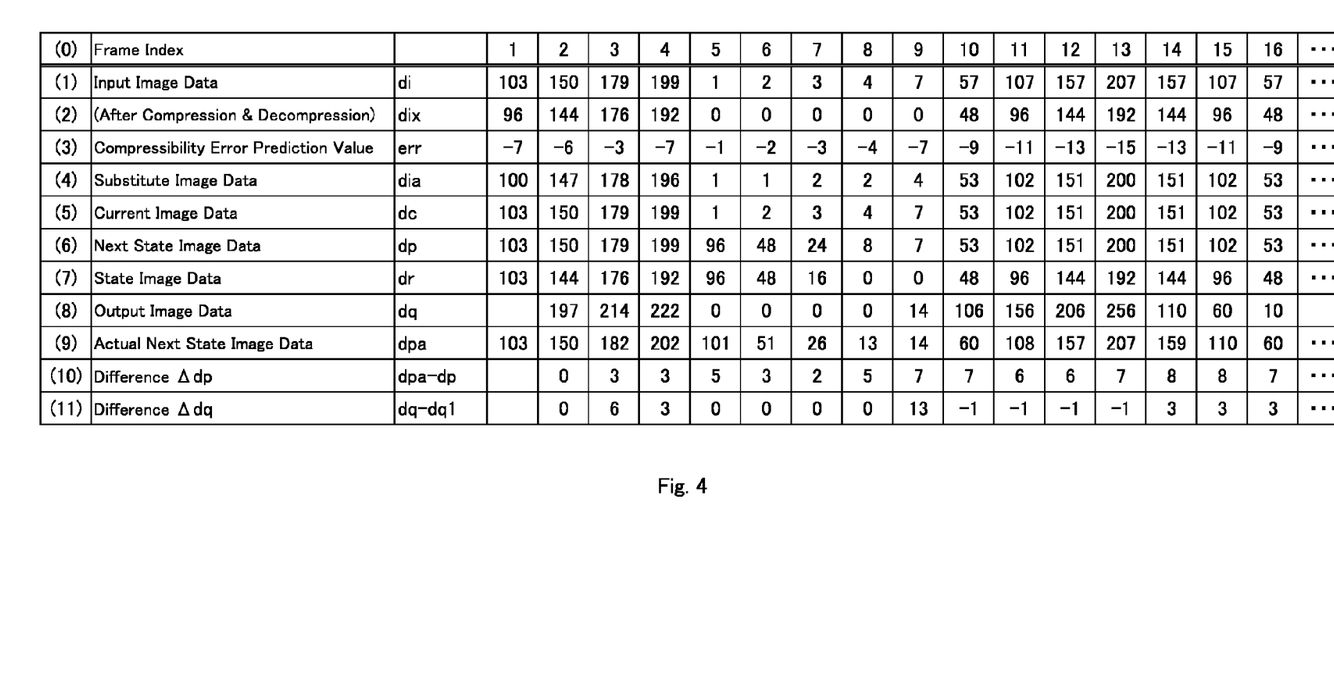
FIG. 4 is a diagram showing processing results and processing performance in Example 3 of the image processing device according to the present invention.

The respective calculation examples in Examples 1 to 3 will be shown in FIGS. 2 to 4. FIGS. 2 to 4 each show the data values shown in FIG. 1 when arbitrary one pixel in a display screen is focused on, and the pixel data di of the relevant one pixel of the input image data DI is serially processed for each frame. Frame indexes in a top line in each of FIGS. 2 to 4 indicate a processing order of continuous frames, illustrating the 1st frame to the 16th frame. Line indices (0) to (11) to specify the lines are given at left ends of the respective lines in FIGS. 2 to 4 for convenience. The index (0) indicates a top line. Hereinafter, the top line is 0 line, and the line indices (1) to (11) are referred to as the 1st to 11th lines.

The 1st line and the 3rd to 8th lines in FIGS. 2 to 4 indicate the data values of the respective pieces of pixel data shown in FIG. 1. which pixel data each of the lines corresponds to can be identified by the name of the pixel data displayed in the 2nd column from left, and the symbol of the pixel data displayed in the 3rd column. Moreover, the 2nd line indicates the data value dix used in the generation algorithm (refer to expressions 6, 7) of the substitute image data DIA of Examples 2 and 3. The pixel data dr of the state image data DR in the 7th line indicates a value resulting from applying the compression and decompression processing to the pixel data dp of the next state image data DP in the 6th line, that is, the pixel data dr for use in the data processing of the next frame.

The 9th line indicates each piece of pixel data of an "actual next state image data" (for convenience, represented as "dpa"). As described above, while each piece of the pixel data dp of the next state image data DP generated in the state image data generation means or step originally results from predicting the state (e.g., the gradation value) of each pixel in the next frame driven in accordance with the output image data DQ, the influence of the compressibility error is superimposed on the output image data DQ, by which discrepancy is caused between the pixel data dp and the actual state of each pixel in the next frame (the pixel data dpa). Specifically, the pixel data dpa is calculated by substituting the pixel data dpa one frame before for a variable dr of an inverse function F' (dq, dr) of the function F (dc, dr).

Moreover, the 10th line indicates a difference Δdp (=dpa− dp) between the pixel data dpa of the "actual next state image data" indicated in the 9th line, and the pixel data dp of the next state image data DP indicated in the 6th line. The difference Δdp indicates the influence of the compressibility error on the next state image data DP. The 11th line indicates a difference Δdq between the image data dq of the output image data DQ indicated in the 8th line, and pixel data dq1 of output image data DQ1 when the data compression and decompression are not performed (described later) (Comparative Example 1). The difference Δdq indicates the influence of the compressibility error on the output image data DQ. As described above, the description items in the 0 to 11th lines are common in the respective examples.

Before considering the calculation examples of the respective examples in FIGS. 2 to 4, for comparison with the respective examples, respective calculation examples of Comparative example 1 and the conventional image processing device (Comparative Example 2) having the configuration shown in FIG. 5, which performs data compression and decompression, will be described. Comparative Example 1 corresponds to the case where the compression and decompression processing by the image compression means 16 and the image decompression means 17 having a circuit configuration of Comparative Example 2 shown in FIG. 5 is not performed. Moreover, the data processing functions of the output image data generation means 14 and the state image data generation means 15 of Comparative Examples 1 and 2 are the same as the data processing functions F (di, dr) and G (di, dr) of the above-described respective examples. However, in Comparative Examples 1 and 2, since the pixel data de of the current data DC is constantly equal to the pixel data di of the input image data DI, a variable dc is replaced by a variable di. The encoding processing function of the image compression means 16 and the decoding processing function of the image decompression means 17 in Comparative Example 2 are the same as the encoding processing function Enc (dp) and the decoding processing function Dec (dpc) of the above-described respective examples.

Figure 6:
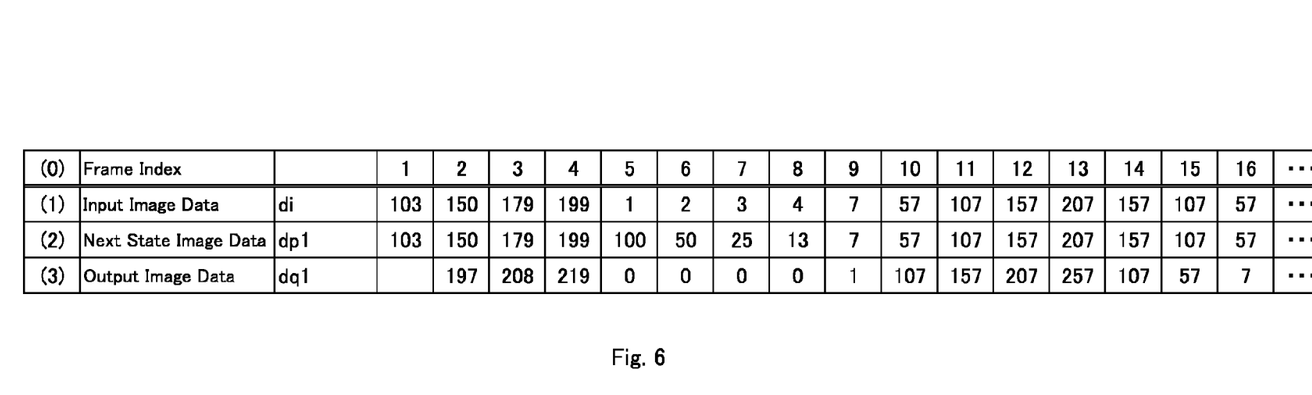
FIG. 6 is a diagram showing processing results in an image processing device that does not perform the compression/decompression processing.
Figure 7:
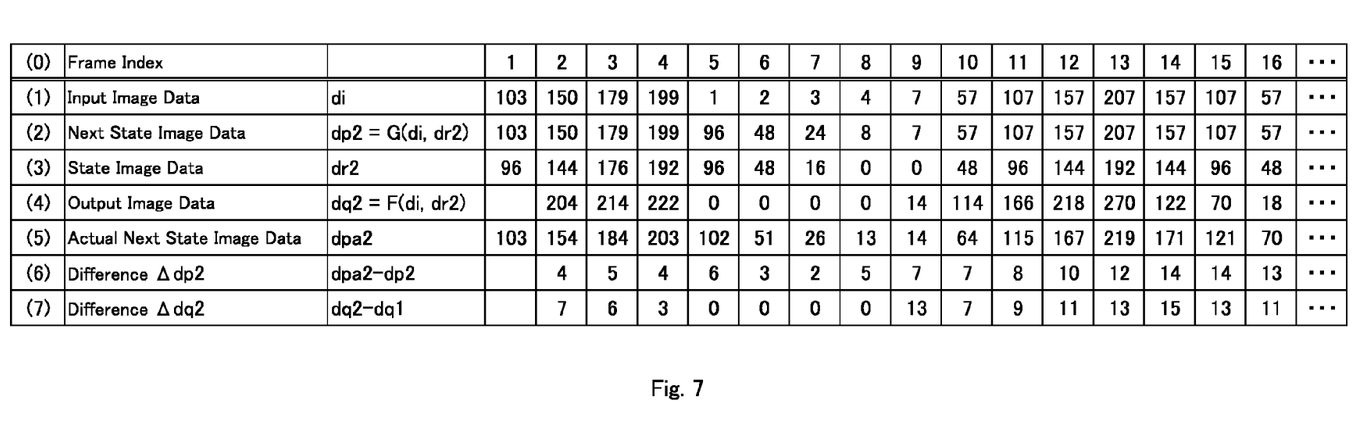
FIG. 7 is a diagram showing processing results and processing performance in the conventional image processing device shown in FIG. 5.

The calculation example of Comparative Example 1 and the calculation example of Comparative Example 2 are shown in FIGS. 6 and 7, respectively. The notation method of FIGS. 6 and 7 is basically the same as that of FIGS. 2 to 4. In the 3rd line of FIG. 6, the pixel data dq1 used in the calculation of the difference $\Delta$dq indicated in the 11th line of FIGS. 2 to 4 is displayed. In Comparative Example 2 of FIG. 7, similar to Examples 1 to 3, the compressibility error occurs, and thus, pixel data dpa2 of the "actual state image data" indicated in the 5th line is calculated. Moreover, the 6th line of FIG. 7 indicates a difference $\Delta$dp2 (=dpa2−dp2) between the pixel data dpa2 of the "actual next state image data" indicated in the 5th line, and the pixel data dp of the next state image data DP indicated in the 2nd line. The difference $\Delta$dp2 indicates the influence of the compressibility error on next state image data DP2 in Comparative Example 2. The 7th line of FIG. 7 indicates a difference $\Delta$dq2 between pixel data dq2 of output image data DQ2 indicated in the 4th line, and the pixel data dq1 of the output image data DQ1 of Comparative Example 1. The difference $\Delta$dq2 indicates the influence of the compressibility error on the output image data DQ2.

From a calculation result of the difference $\Delta$dq2 indicated in the 7th line of FIG. 7, the pixel data dq2 of the output image data DQ2 in Comparative Example 2 is constantly higher than an original value when there is no influence of the compressibility error, and from a calculation result of the difference $\Delta$dp2 indicated in the 6th line, it is found that the influence of the compressibility error is accumulated along with repetition of the frame processing. This falls in with a fact that the compressibility error constantly decreases the data value after the processing below that before the processing in the compression and decompression processing by the encoding processing function Enc (dp) and the decoding processing function Dec (dpc), which are used in Examples 1 to 3 and Comparative Example 2 and exemplified in expressions 3 and 4. Furthermore, the fact that the compressibility error constantly decreases the data value after the processing below that before the processing corresponds to a fact that the pixel data err of the compressibility error prediction value ERR of each of the frames is a negative value in Examples 1 to 3. Accordingly, in Examples 1 to 3, in order to cancel the influence of the compressibility error, in any of the examples, conversion processing (correction processing) expressed in expressions 5 to 7 is performed to the pixel data di to calculate the pixel data dia so that each piece of the pixel data dia of the substitute image data DIA is smaller than each piece of the pixel data di of the input image data DI.

First, referring to FIGS. 2 and 7, in comparison between the difference $\Delta$dq of Example 1 and the difference $\Delta$dq2 of Comparative Example 2, an absolute value of the difference $\Delta$dq is not higher than an absolute value of the difference $\Delta$dq2 except for the 10th frame, and as to an average value of the 2nd to 15th frames, it is 7.2 in Comparative Example 2, while it is decreased to 3.67 in Example 1. In the present examples, the pixel data di of the input image data DI increases by 50 each frame from the 9th to 13th frames. In the present image processing device 1, since the compressibility error prediction means 11 calculates the pixel data err of the compressibility error prediction value ERR, based on the pixel data di of the current frame, if the change of the pixel data di between the adjacent frames is large, an error occurs in the pixel data err. As a result, opposite to Comparative Example 2, there occurs a case where the pixel data dq of the output image data DQ is lower than the original value when there is no influence of the compressibility error. However, it is found that as a whole, the influence of the compressibility error on the output image data DQ is reduced.

Further, in comparison between the difference $\Delta$dp of Example 1 and the difference $\Delta$dp2 of Comparative Example 2, in each of the frames, the difference $\Delta$dp is not more than the difference $\Delta$dp2, and as to the average value from the 2nd frame to the 15th frame, it is 7.6 in Comparative Example 2, while it is decreased to 4.33 in Example 1. Accordingly, it is found that the influence of the compressibility error on the pixel data dp of the next state image data DP is reduced, and further that the accumulation of the compressibility error is suppressed.

Next, referring to FIGS. 3 and 7, in comparison between the difference $\Delta$dq of Example 2 and the difference $\Delta$dq2 of Comparative Example 2, the absolute value of the difference $\Delta$dq is not less than the absolute value of the difference $\Delta$dq2 except for the 10th to 13th frames, and as to the average value of the 2nd to 15th frames, it is 7.2 in Comparative Example 2, while it is slightly decreased to 7 in Example 2. In Example 2, as compared with Example 1, it is found that the reduction effect of the influence of compressibility error on the output image data DQ is smaller.

However, in comparison between the difference $\Delta$dp of Example 2 and the difference $\Delta$dp2 of Comparative Example 2, in each of the frames, the difference $\Delta$dp is not more than the difference $\Delta$dp2, and as to the average value from the 2nd frame to the 15th frame, it is 7.6 in Comparative Example 2, while it is decreased to 3 in Example 2. Accordingly, it is found that the influence of the compressibility error on the pixel data dp of the next state image data DP is reduced more than that of Example 1, and further that the accumulation of the compressibility error is suppressed more effectively.

Next, referring to FIGS. 4 and 7, in comparison between the difference $\Delta$dq of Example 3 and the difference $\Delta$dq2 of Comparative Example 2, the absolute value of the difference $\Delta$dq is not higher than the absolute value of the difference $\Delta$dq2 in all the frames, and as to the average value of the 2nd to 15th frames, it is 7.2 in Comparative Example 2, while it is decreased to 2.33 in Example 3. In Example 3, as compared with Example 1, it is found that the reduction effect of the influence of the compressibility error on the output image data DQ is very large.

Moreover, in comparison between the difference $\Delta$dp of Example 3 and the difference $\Delta$dp2 of Comparative Example 2, in each of the frames, the difference $\Delta$dp is not more than the difference $\Delta$dp2, and as to the average value from the 2nd frame to the 15th frame, it is 7.6 in Comparative Example 2, while it is decreased to 5.13 in Example 2. Accordingly, it is found that the influence of the compressibility error on the pixel data dp of the next state image data DP is reduced, and further that the accumulation of the compressibility error is suppressed more effectively. However, the reduction effect of the influence of the compressibility error on the pixel data dp is smaller than those of Examples 1 and 2.

As described above, the respective calculation examples of Examples 1 to 3 have been considered in detail in comparison with Comparative Example 2. It is found that although there are some degree of differences among the respective examples, the influence of the compressibility error on the pixel data dq, dp of the output image data DQ and the next state image data DP is reduced in any of the examples. Moreover, it is found that on which of the output image data DQ and the next state image data DP the reduction of the influence of the compressibility error is achieved more effectively differs, depending on the difference in the generation algorithm of the substitute image data DIA.

While in the foregoing, the examples of the image processing (the present invention method) of the present invention device 1 have been described in detail, based on the specific calculation examples, the present invention device and method are not limited to the specific processing contents described in the respective examples. For example, a number of pixels, the gradation value, a color system (color display format) of the image data treated in the present invention device and method are not limited to the above-described examples. Furthermore, the data processing contents of the output image data generation means 14 and the state image data generation means 15 are not limited to the data processing functions F (dc, dr), G (dc, dr) expressed by expressions 1 and 2, either. Moreover, while the data processing function F(dc, dr) is for the overshoot processing in the respective examples, another data processing function for correction processing may be employed.

Moreover, while in the above-described respective examples, the case has been exemplified, where the data processing functions Enc(dp), Dec(dpc) expressed by expressions 3 and 4 are used as the encoding processing function of the image compression means 16 and the decoding processing function of the image decompression means 17, the respective data processing functions are not limited to the data processing functions expressed by expressions 3 and 4.

While in the above-described examples, the cases have been described, where as the generation algorithm of the substitute image data DIA of the substitute image data generation means 12, the three types expressed by expressions 5 to 7 are used, the relevant generation algorithm is not limited to those expressed by expressions 5 to 7. As described above, since the generation algorithm of the substitute image data DIA largely depends on the respective processing contents of the output image data generation means 14, the state image data generation means 15, the image compression means 16, and the image decompression means 17, it is important to set it so as to suit the compressibility error by the relevant processing contents, and a tendency and characteristics of how the influence of the compressibility error emerges. For example, in the compression/decompression processing used in the above-described examples, since the compressibility error constantly decreases the data value after the relevant processing below that before the processing, in the above-described examples, the generation algorithm that makes each piece of the pixel data dia of the substitute image data DIA smaller than each piece of the pixel data di of the input image data DI is used. Accordingly, when the compressibility error of the used compression/decompression processing constantly increases the data value after the relevant processing beyond that before the processing, it is important to use generation algorithm that makes each piece of the pixel data dia of the substitute image data DIA larger than each piece of the pixel data di of the input image data DI. Furthermore, when the compressibility error of the used compression/decompression processing increases/decreases the data value after the relevant processing in comparison with that before the processing, for example, increase/decrease information (1 bit/pixel) is stored in a part of the frame memory for the generation processing of the substitute image data DIA in the next frame, which enables use of generation algorithm based on the increase/decrease information.

Moreover, while in the above-described embodiment, specific circuit configurations of the respective means of the present invention device 1 have not been described in detail, some or all of the respective means may be configured as software means that implements the operation processing in the respective means by executing a computer program, using an operation processing device such as a well-known microprocessor and the like, and further, some or all of the respective means may be configured as hardware means using well-known logic circuits or memory circuits.

EXPLANATION OF REFERENCES

1: image processing device
11: compressibility error prediction means
12: substitute image data generation means
13: current image data selection means
14: output image data generation means
15: state image data generation means
16: image compression means
17: image decompression means
18: frame memory
DC: current image data
DI: input image data
DIA: substitute image data
DP: next state image data
DPC: compressed state image data
DR: state image data
DQ: output image data
ERR: compressibility error prediction value
IN: input terminal
OUT: output terminal

The invention claimed is:
1. An image processing device comprising:
state image data generation means for generating next state image data for use at the time of next frame processing, based on current image data and state image data;
image compression means for compressing the next state image data to generate compressed state image data;
a frame memory that stores the compressed state image data;
image decompression means for reading, from the frame memory, the compressed state image data stored at the time of previous frame processing, and decompressing the data to generate the state image data;
output image data generation means for generating output image data, based on the current image data and the state image data;
compressibility error prediction means for generating a compressibility error prediction value of a compressibility error caused by the image compression means and the image decompression means, based on input image data;

substitute image data generation means for generating substitute image data for the input image data, based on an emergence tendency of the compressibility error; and current image data selection means for selecting any one of the input image data and the substitute image data to set a result as the current image data.

2. The image processing device according to claim 1, wherein for each piece of pixel data of the input image data, based on processing contents of the state image data generation means, the image compression means, and the image decompression means, the compressibility error prediction means calculates, as the compressibility error prediction value, a difference between each piece of pixel data of the state image data after compression and decompression processing by the image compression means and the image decompression means, and that before the compression and decompression processing.

3. The image processing device according to claim 1, wherein for each piece of the pixel data of the input image data, the substitute image data generation means generates each piece of pixel data of the substitute image data by a predetermined method decided on the basis of the respective processing contents of the state image data generation means, the image compression means, and the image decompression means.

4. The image processing device according to claim 1, wherein, for each piece of the pixel data of the input image data, the substitute image data generation means applies correction to increase or decrease a data value to each piece of the pixel data of the input image data in accordance with increase/decrease in a data value of each piece of the pixel data between the next state image data and the state image data, and generates each piece of the pixel data of the substitute image data, the increase/decrease being caused by the compressibility error by the compression and decompression processing by the image compression means and the image decompression means.

5. The image processing device according to claim 1, wherein for each piece of the pixel data of the input image data, when the compressibility error prediction value is within a predetermined range, the current image data selection means selects the input image data, and when the compressibility error prediction value is out of the predetermined range, the current image data selection means selects the substitute image data.

6. An image processing method comprising:
a state image data generation step for generating next state image data for use at the time of next frame processing, based on current image data and state image data;
an image compression step for compressing the next state image data to generate compressed state image data;
a storage step for storing the compressed state image data in a frame memory;
an image decompression step for reading, from the frame memory, the compressed state image data stored at the time of previous frame processing, and decompressing the data to generate the state image data;
an output image data generation step for generating output image data, based on the current image data and the state image data;
a compressibility error prediction step for generating a compressibility error prediction value of a compressibility error caused by the image compression step and the image decompression step, based on input image data;
a substitute image data generation step for generating substitute image data for the input image data, based on an emergence tendency of the compressibility error; and
a current image data selection step for selecting any one of the input image data and the substitute image data to set a result as the current image data.

7. The image processing method according to claim 6, wherein for each piece of pixel data of the input image data, based on processing contents of the state image data generation step, the image compression step, and the image decompression step, the compressibility error prediction step calculates, as the compressibility error prediction value, a difference between each piece of pixel data of the state image data after compression and decompression processing by the image compression step and the image decompression step, and that before the compression and decompression processing.

8. The image processing method according to claim 6, wherein for each piece of the pixel data of the input image data, the substitute image data generation step generates each piece of pixel data of the substitute image data by a predetermined method decided on the basis of the respective processing contents of the state image data generation step, the image compression step, and the image decompression step.

9. The image processing method according to claim 6, wherein, for each piece of the pixel data of the input image data, the substitute image data generation step applies correction to increase or decrease a data value to each piece of the pixel data of the input image data in accordance with increase/decrease in a data value of each piece of the pixel data between the next state image data and the state image data, and generates each piece of the pixel data of the substitute image data, the increase/decrease being caused by the compressibility error by the compression and decompression processing by the image compression step and the image decompression step.

10. The image processing method according to claim 6, wherein for each piece of the pixel data of the input image data, when the compressibility error prediction value is within a predetermined range, the current image data selection step selects the input image data, and when the compressibility error prediction value is out of the predetermined range, the current image data selection step selects the substitute image data.

* * * * *